United States Patent [19]

Feldle et al.

[11] Patent Number: 4,632,404
[45] Date of Patent: Dec. 30, 1986

[54] SEAL FOR ROLLING BEARING

[75] Inventors: Kurt Feldle, Würzburg; Karl-Friedrich Kaschube, Niederwerrn, both of Fed. Rep. of Germany

[73] Assignee: SKF GmbH, Schweinfurt, Fed. Rep. of Germany

[21] Appl. No.: 772,025

[22] Filed: Sep. 3, 1985

[30] Foreign Application Priority Data

Jul. 9, 1984 [DE] Fed. Rep. of Germany ... 8426383[U]

[51] Int. Cl.⁴ .................... F16C 33/78; F16J 15/32
[52] U.S. Cl. ........................................ 277/68; 277/92; 277/95; 277/152; 277/184; 277/188 R; 384/140; 384/143; 384/147; 384/486
[58] Field of Search ............ 277/68, 133, 95, 53, 277/188 R, 207 R, 184, 152, 92; 384/486, 485, 484, 147, 140, 143

[56] References Cited

U.S. PATENT DOCUMENTS

| 2,856,208 | 10/1958 | Cobb | 277/133 X |
| 3,203,740 | 8/1965 | Peickit et al. | 384/486 |
| 3,639,016 | 2/1972 | Bourgeois | 277/95 X |
| 3,667,767 | 6/1972 | Bakewell | 277/95 |
| 3,906,746 | 9/1975 | Haines | 277/95 X |
| 4,304,412 | 12/1981 | Ladin | 384/386 X |
| 4,402,558 | 9/1983 | Olschewski et al. | 384/486 X |
| 4,502,739 | 3/1985 | Flander | 384/484 X |

FOREIGN PATENT DOCUMENTS 2930462 1/1981 Fed. Rep. of Germany ...... 384/147

Primary Examiner—Allan N. Shoap
Attorney, Agent, or Firm—Rosen, Dainow & Jacobs

[57] ABSTRACT

A seal for a rolling bearing having an outer bearing ring, an inner bearing ring and rolling elements between the outer and inner rings. A seal extends from one of the bearing rings and has axially extending sealing lips engaging a centrifuge plate extending from the other bearing ring. The free end of the centrifuge plate extends to the region of the bearing ring to which it is not affixed, and is angled axially outwardly therefrom.

7 Claims, 2 Drawing Figures

SEAL FOR ROLLING BEARING

FIELD OF THE INVENTION

This invention relates to a seal for a rolling bearing, and more particularly to a seal arranged on one of the bearing rings, preferably on the outer ring, and having several substantially axially directed, outwardly extending seal lips and wherein a centrifuge plate is arranged on the other bearing ring, the sealing lips running on the axially inner side surface of the centrifuge plate with pretension.

BACKGROUND OF THE INVENTION

A seal of this type is disclosed for example in U.S. Pat. No. 2,856,208. In this arrangement the centrifuge plate is provided with a cylindrical seat mounted on a shoulder of the inner ring, while the radially directed annular flange of the centrifuge plate is inclined with respect to the outer ring. Since the centrifuge plate is axially inwardly directed toward the outer ring, the danger arises that liquids, especially those directed from outside the bearing toward the seal, are thrown against the outer ring, and penetrate the groove in the outer ring of the bearing through the seat of the seal. Otherwise, the centrifuge plate is radially relatively short, providing only a minimum centrifugal action, especially at minimum rotation speeds of the plate.

SUMMARY OF THE INVENTION

The object of the present invention is to so improve a seal of the above-described type that the liquids are directed centrifugally away from the seal at minimum rotational speeds of the centrifuge plate so that the liquids are not thrown against the outer ring.

This object is solved in accordance with the invention by extending the centrifuge plate to the region of the outer ring and angling its free end axially outwardly.

As a result, on the one hand, the diameter of the centrifuge plate is increased so that a greater escape force is produced and, on the other hand, the centrifuged liquids are held further away from the outer ring.

According to a further feature of the invention the sealing ring is so formed that one of the sealing lips, which extend essentially in the axially outward direction, runs on the side surfaces of the angled end of the centrifuge plate. In order to increase the sealing action, in accordance with a still further feature of the invention, the seal can be provided with a projection adjacent the substantially axially directed sealing lips, the projection extending radially towards the circumferential surface of the other bearing ring and forming an annular gap therebetween. Obviously in accordance with a further feature of the invention, it is also possible to provide the seal with a sealing lip extending radially against the circumferential surface of the other bearing ring and engaging the other bearing ring with prestress.

In order to make the escape of lubricant from the bearing inner space more difficult, in accordance with a further feature of the invention, the seal is provided with an inclined surface adjacent the free end thereof directed toward the other bearing ring, the seal widening from its free end so that the inclined surface extends axially inward into the bearing inner space. This inclined surface directs lubricant thrown off from the bearing inner ring back to the bearing inner space.

BRIEF DESCRIPTION OF THE DRAWINGS

In order that the invention may be more clearly understood, it will now be disclosed in greater detail with reference to the accompanying drawings wherein.

DETAILED DESCRIPTION OF THE PREFERRED EMBODIMENTS

Figure 1:
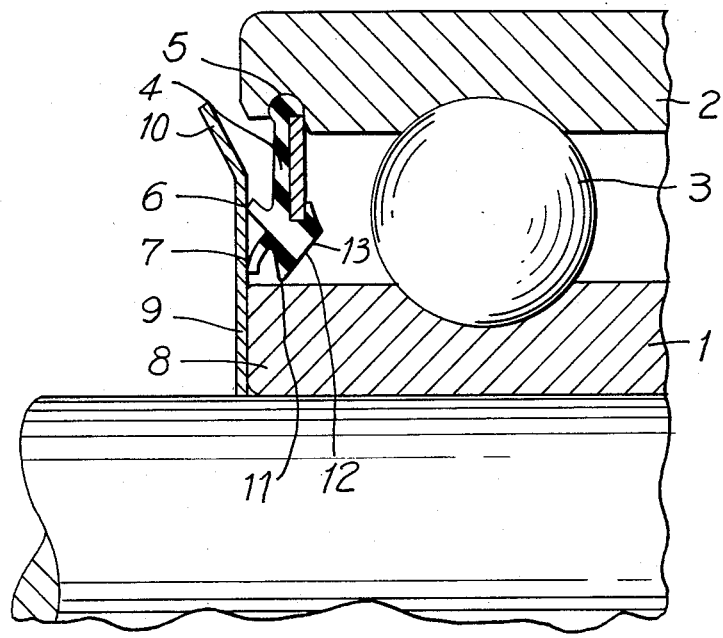
FIG. 1 is a partial cross-sectional view of a grooved ball bearing with a seal in accordance with one embodiment of the invention.

Referring now to FIG. 1, the rolling bearing is comprised of an inner ring 1, an outer ring 2 and a plurality of balls 3 guided by a cage (not shown) between the two bearing rings. A seal 4 is provided for sealing the bearing, the seal being affixed in a recess 5 in the bore of the outer ring 2. The seal has substantially outwardly axially directed, radially spaced apart sealing lips 6 and 7 which slidingly engage the axially inner side surface 8 of a centrifuge plate 9 arranged, for example, to rotate with the inner ring 1 of a shaft on which the inner ring is mounted. Thus, as illustrated, for exemplary purposes only, the plate 9 may be affixed to the end of inner ring 1. The centrifuge plate 9 extends radially outwardly to the area of the outer ring 2 and its radially outer free end 10 is inclined axially outwardly of the bearing. The seal 4 has a projection 12 adjacent the sealing lips 6 and 7, the projection 12 being directed radially inward toward the circumferential surface of the inner ring 1 and forming an annular gap 11 therewith. The radially outer edge of the centrifuge plate 9 is hence preferably substantially in axial alignment with the outer ring.

Furthermore, the seal 4 is provided on its radially inner free end with an inclined surface 13 enlarging into the bearing inner space from the free end thereof. This inclined surface 13, together with the seal gap 11, inhibits any significant quantity of the lubricant from escaping from the bearing inner space. Lubricant thrown from the shoulder of the inner ring 1 is guided back to the inner bearing space by this inclined surface. The sealing lips 6 and 7 avoid further escape of the lubricant, so that especially the sealing lip 6 prevents foreign materials from outside the bearing entering the bearing inner space by force. The centrifuge plate 9 throws off external liquids directed against the bearing, so that the angled end 10 of the centrifuge plate directs the liquid flow away from the bearing outer ring.

Figure 2:
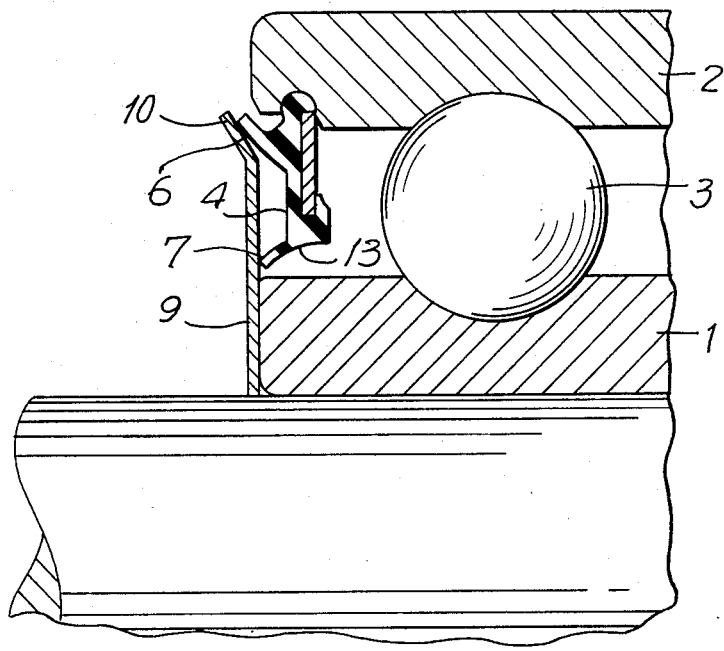
FIG. 2 is a partial cross-sectional view of a grooved ball bearing illustrating a second sealing arrangement in accordance with the invention.

In accordance with the embodiment of the invention illustrated in FIG. 2, the seal 4 is so formed that the sealing lip 6 sealingly runs on the axially inner side surface of the angled end 10 of the centrifuged plate 9. The side of the seal 4 is likewise so formed at its free end, on the side directed toward the bearing inner space, that the lubricant thrown from the bearing inner ring is directed axially inwardly back to the bearing inner space.

The two sealing lips 6 and 7 can run with the same prestress force on the respective surfaces of the centrifuge plate 9. It is also possible, for example, to provide the sealing lip 6 with a lesser prestress force than the sealing lip 7.

While the invention has been disclosed and described with respect to two embodiments thereof, it is apparent that variations and modifications may be made therein, and it is therefore intended in the following claims to cover each such variation and modification as falls within the true spirit and scope of the invention.

What is claimed is:

1. In a seal for a rolling bearing comprised of inner and outer bearing rings defining an inner space therebetween and rolling elements arranged to roll between said rings, the seal being affixed to the outer bearing ring, the seal having a plurality of axially outwardly directed sealing lips, and a centrifuge plate affixed to the inner bearing ring and arranged to rotate therewith, the sealing lips engaging under the axially inner surface of the centrifuge plate facing said rolling elements, the improvement wherein the centrifuge plate has a radially outer free end substantially in axial alignment with the bearing outer ring and has a first portion adjacent said inner bearing ring that extends substantially directly in the radial direction and a second portion depending therefrom and extending to said free end that is axially outwardly inclined.

2. The seal for a rolling bearing of claim 1, wherein one of said substantially axially outwardly directed sealing lips slidingly engages the surface of said outwardly inclined portion of the centrifuge plate.

3. The seal for a rolling bearing of claim 2 wherein another of said substantially axially outwardly directed sealing lips slidingly engages said first portion of said centrifuge plate.

4. The seal for a rolling bearing of claim 1 wherein the seal is provided with a projection extending radially toward the circumferential surface of the inner bearing ring and forming an annular gap therewith.

5. A seal for a rolling bearing according to claim 1 wherein the seal has a radially inner free end, said free end of said seal having a surface shaped to direct lubricant thrown from said inner ring back toward the bearing inner space.

6. The seal for a rolling bearing of claim 5 wherein said lubricant throwing surface is an inclined surface expanding into said bearing inner space from said free end of said seal.

7. The seal for a rolling bearing according to claim 5 wherein said radially inner free end has a radially innermost extension and extends therefrom in the inner axial direction continually therefrom to said bearing inner space.

* * * * *